US012301706B1

(12) United States Patent
Stapleton

(10) Patent No.: US 12,301,706 B1
(45) Date of Patent: May 13, 2025

(54) TRANSLATE RANDOM UNIQUE METHOD FOR PASSCODE ENCRYPTION TECHNOLOGY

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 324 days.

(21) Appl. No.: 17/645,634

(22) Filed: Dec. 22, 2021

(51) Int. Cl.
*H04L 9/08* (2006.01)
*H04L 9/32* (2006.01)

(52) U.S. Cl.
CPC ........... *H04L 9/0825* (2013.01); *H04L 9/085* (2013.01); *H04L 9/0866* (2013.01); *H04L 9/3231* (2013.01)

(58) Field of Classification Search
None
See application file for complete search history.

(56) References Cited

U.S. PATENT DOCUMENTS

| | | | |
|---|---|---|---|
| 6,751,733 B1 | 6/2004 | Nakamura et al. | |
| 7,415,138 B2 | 8/2008 | Schneider et al. | |
| 8,819,428 B2 | 8/2014 | Baig | |
| 9,123,042 B2 | 9/2015 | Von Mueller et al. | |
| 9,185,214 B2 | 11/2015 | Springer | |
| 9,646,306 B1 | 5/2017 | Quigley et al. | |
| 10,326,803 B1* | 6/2019 | Haney | H04L 63/30 |
| 10,433,168 B2 | 10/2019 | Tung | |
| 11,405,189 B1* | 8/2022 | Bennison | H04L 63/0807 |
| 2002/0184509 A1 | 12/2002 | Scheidt et al. | |
| 2003/0120934 A1 | 6/2003 | Ortiz | |
| 2004/0020982 A1 | 2/2004 | Hoffman et al. | |
| 2004/0044739 A1 | 3/2004 | Ziegler | |
| 2006/0083408 A1 | 4/2006 | Hoffman et al. | |
| 2015/0199682 A1* | 7/2015 | Kalgi | G06Q 20/32 705/64 |

(Continued)

FOREIGN PATENT DOCUMENTS

| | | |
|---|---|---|
| BR | 102012029113 | 10/2013 |
| CN | 102306286 | 1/2012 |

(Continued)

OTHER PUBLICATIONS

Lee, Sanghoon, "Design and Implementation for Data Protection of Energy IoT utilizing OTP in the Wireless Mesh Network", Energy Procedia 141, (2017), 5 pgs.

*Primary Examiner* — Saleh Najjar
*Assistant Examiner* — Shadi H Kobrosli
(74) *Attorney, Agent, or Firm* — SCHWEGMAN LUNDBERG & WOESSNER, P.A.

(57) ABSTRACT

Systems and methods may generally be used to authenticate user credentials. An example method may include using a personal identifier and a stored base derivation key to generate an initial key value, generating a current key value using an initial key value and a counter, determining a decryption key from the current key value and decrypting an encrypted secret value using the decryption key to identify a password. The method may include generating a password check value using the current key value and the device identifier, and determining whether to authenticate the user device based on whether the password check value indicates that the password is valid.

20 Claims, 5 Drawing Sheets

(56) References Cited

U.S. PATENT DOCUMENTS

| | | |
|---|---|---|
| 2019/0295076 A1 | 9/2019 | Dimmick |
| 2020/0058032 A1 | 2/2020 | Lad et al. |
| 2020/0220719 A1* | 7/2020 | Chaudhari ............ H04L 9/0822 |
| 2020/0302156 A1 | 9/2020 | Wang et al. |
| 2020/0320489 A1* | 10/2020 | Vagare ................. H04L 9/0838 |
| 2021/0073794 A1 | 3/2021 | Polania |
| 2023/0090972 A1* | 3/2023 | Rezaei ................. H04L 9/3226 |
| | | 713/171 |
| 2024/0193250 A1* | 6/2024 | Chen ................... H04W 12/069 |

FOREIGN PATENT DOCUMENTS

| | | | |
|---|---|---|---|
| CN | 103258270 | 11/2015 | |
| CN | 108337264 | 7/2018 | |
| EP | 3540671 A1 * | 9/2019 | ............ G06Q 20/22 |
| KR | 102250732 B1 * | 5/2019 | |
| KR | 20210058459 | 5/2021 | |
| KR | 20230004041 A * | 6/2021 | |
| WO | 2007035970 | 3/2007 | |
| WO | WO-2018096559 A1 * | 5/2018 | |

\* cited by examiner

TRANSLATE RANDOM UNIQUE METHOD FOR PASSCODE ENCRYPTION TECHNOLOGY

BACKGROUND

When using point of sale (POS) or automated teller machine (ATM) devices, a personal identification number (PIN) is often used to secure a transaction. The PIN may be encrypted, including using Derived Unique Key Per Transaction (DUKPT) for key management. DUKPT is used for deriving a unique key from a fixed key. One version of DUKPT is described in the American National Standards Institute (ANSI) X9.24 part 1 standard.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and techniques described herein may be used to authenticate user credentials. For example, a technique may include receiving credential information. A portion of the credential information may be used to modify a stored base derivation key to generate a current key value, and a decryption key. A portion of the credential information may be decrypted to identify a password. The password may be generated at a user device using a string representing a user gesture. The password may be checked for validity, and when valid, a user device may be permitted to access a secure resource. The systems and techniques described herein provide increased security while allowing a user flexibility in device and password entry preferences. The systems and techniques described herein provide increased security without requiring a user to increase effort at remembering or creating difficult passwords.

The systems and techniques described herein provide passcode encryption with a derived unique key that changes with each transaction. The present systems and techniques use a key to encrypt a random passcode. In some examples, the passcode may be synchronized per transaction between a user point of entry (UPE) and a passcode verification system (PVS).

The present systems and techniques use an input value such as a number derived from a gesture, utterance, password, biometric, or the like. The number is translated from the gesture, etc., to create a random passcode, which is then encrypted for transmission. An authentication system may use the systems and techniques described herein to synchronize itself with a passcode encryption key and a random passcode.

Figure 1:
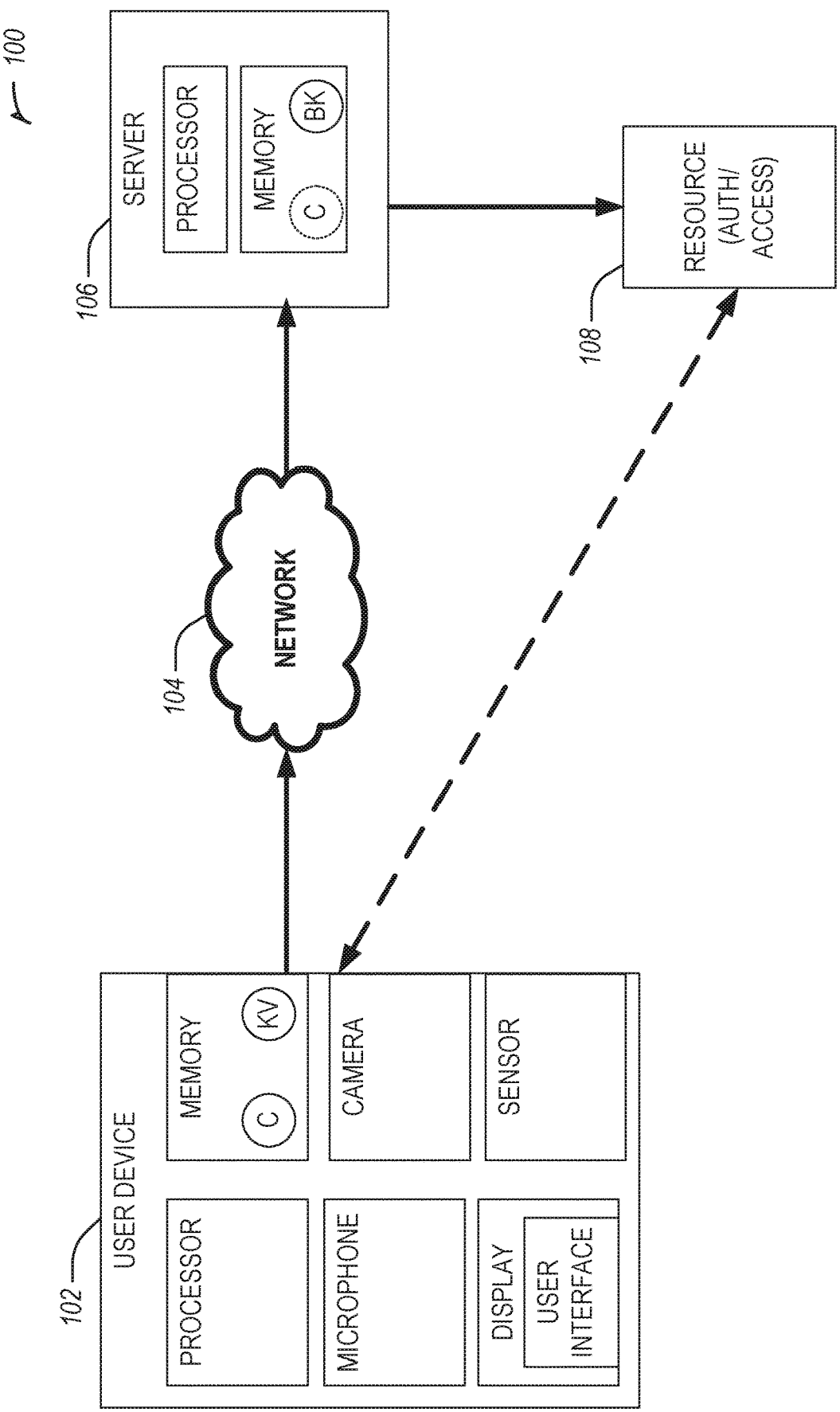
FIG. 1 illustrates a system for authenticating user credentials in accordance with some embodiments.

FIG. 1 illustrates a system 100 for authenticating user credentials in accordance with some embodiments. The system 100 includes a user device 102 that communicates with a server 106 over a network 104 (e.g., the internet, a secure network, etc.). The server 106 may communicate with or control aspects of a resource 108. In an example, the user device 102 requests access to the resource 108, which the server 106 may grant, such as after authenticating the user device 102 or verifying the user device 102 may have access to the resource 108.

The user device 102 includes a processor and memory, the memory storing a counter and an initial key value or a current key value, in some examples. The user device 102 may include a microphone, a camera, a display (e.g., for showing a user interface), a sensor, or the like. The server 106 may optionally store the counter, in some examples, in memory of the server 106. The server 106 may include a processor. The memory of the server 106 stores a base key (e.g., as described herein, which may be used to generate user-specific or device-specific unique keys).

In an example, the user device 102 may be associated with an identifier, $ID_1$. A user that is operating the user device 102 may have an associated identifier $ID_0$. When the user is operating a different user device, the different user device may have a different unique identifier, while the user maintains the associated identifier $ID_0$ across all the user's devices. This allows the same user to have different devices without repeating random passcodes, but minimizes the need for the user to remember or access multiple identifiers.

Table 1 below shows operations for authenticating a user operating the user device 102 by the server 106. In an initial setup operation before the operations of Table 1, a value $X_0$ may be sent, for example from the server 106 or a device associated with the server 106, to a client (e.g., user device 102). This may be done, for example, via a separate channel, such as email, a phone call, some other setup such as in person, etc. The initial value $X_0$ may be used for an initial use to generate an initial key, and then discarded.

A key may include a derived key. In an example, a derived unique key may include a key derived using the Derived Unique Key Per Transaction (DUKPT) standard (American National Standard Institute (ANSI) X9.24 Retail Financial Services—Symmetric Key Management—Part 3: Derived Unique Key Per Transaction (DUKPT), October 2017). The DUKPT standard is used to encrypt a personal identification number (PIN), such as for use at a merchant point of sale (POS) device or an automated teller machine (ATM).

In Table 1, the $ID_0$ is a user identifier, $ID_1$ is a device identifier (e.g., corresponding to a desktop computer, laptop computer, phone, etc.). U is a number or value corresponding to a user input (e.g., gesture, a biometric, audio, a swipe on a user interface, or the like). U may include a string derived from the user input. C is a counter that is used to generate a new unique key based on the initial value $X_0$. B, F, G, H, T are functions that operate to transform inputs into outputs. $K_1$ is key derived from $X_1$ (e.g., based on an updated $X_0$ using the counter). H is a hash function, one-way function, or other type of function to combine $X_1$ and $ID_1$ into $Y_1$, which is a check value. T is a function that uses the user input U and the check value Y1 to create $P_1$ (e.g., a password). The password $P_1$ is encrypted using the key $K_1$, to create encrypted password $Z_1$, which is then sent to the server. The client sends the counter C, both identifiers $ID_1$ and $ID_0$, and the encrypted password $Z_1$. The client (e.g., user device 102) may update the counter (e.g., increment the counter) after sending.

The server 106, after receiving those values from the client, recreates $X_0$ from a base key and $ID_0$. The server 106 uses the received counter C, and applies the F function to the $X_0$ a number of times corresponding to the counter. For example, when the counter is 1, the function F is applied to $X_0$ once to generate $X_1$. Subsequent counters increment further, such as five times to generate $X_5$ when the counter is five. The server 106 uses function G to create $K_1$, and decrypts $Z_1$ to create $P_1$. The password $P_1$ may be checked against the check value $Y_1$ using function A to determine whether the authentication of the client at the user device 102 passes or fails. The check value $Y_1$ is generated at the server 106 using the $X_1$, the $ID_1$, and the function H (e.g., hash).

During a subsequent authentication, the counter has been incremented, so a new $K_X$, $Y_X$, $P_X$ are used. The server 106 does not need to store the counter, but may store a last used counter to compare to an incoming counter to ensure the incoming counter is greater than the last used counter. The server 106 may store the base key, without further storing any of the values of Table 1.

In some examples, the counter may have a maximum number N. When this maximum number is reached, the base key, an identifier (e.g., $ID_0$ or $ID_1$), or one of the functions may be modified, phased out, or otherwise changed. In some examples, the password $P_1$ may be checked against a saved password at the server 106. In other examples, the password $P_1$ is not independently verified (but is still used to check against the check value $Y_1$), and is used for adding complexity to the system.

TABLE 1

| Client (user device 102) | Server 106 |
|---|---|
| $ID_0$ is identifier of the user<br>$ID_1$ is identifier of the user's device<br>U is based on a user input (e.g., a string from a gesture) | BK is base derivation key of the server |
| | $B(BK, ID_0) = X_0$<br>$ID_1$ is identifier of the user's device |
| $F(X_0) = X_1$ where<br>C = 1<br>$G(X_1) = K_1$<br>$H(X_1, ID_1) = Y_1$<br>$T(U, Y_1) = P_1$<br>Client sends to Server:<br>C = 1, $ID_0$, $ID_1$<br>Encrypt $(K_1, P_1) = Z_1$ | $B(BK, ID_0) = X_0$<br>C = 1<br>$F^1(X_0) = X_1$<br>$G(X_1) = K_1$<br>Decrypt $(K_1, Z_1) = P_1$<br>$H(X_1, ID_1) = Y_1$<br>$A(Y_1, P_1)$ = Pass or Fail |
| $F(X_1) = X_2$<br>where C = 2<br>$G(X_2) = K_2$<br>$H(X_2, ID_1) = Y_2$<br>$T(U, Y_2) = P_2$ | |

TABLE 1-continued

| Client (user device 102) | Server 106 |
|---|---|
| Client sends to Server:<br>C = 2, $ID_0$, $ID_1$<br>$E(K_2, P_2) = Z_2$ | $B(BK, ID_0) = X_0$<br>C = 2<br>$F^2(X_0) = X_2$<br>$G(X_2) = K_2$<br>Decrypt $(K_2, Z_2) = P_2$<br>$H(X_2, ID_1) = Y_2$<br>$A(Y_2, P_2)$ = Pass or Fail |
| . . . repeat until N = some maximum number<br>$F(X_{N-1}) = X_N$<br>where C = N<br>$G(X_N) = K_N$<br>$H(X_N, ID_1) = Y_N$<br>$T(U, Y_N) = P_N$<br>Client sends to Server:<br>C = 2, $ID_0$, $ID_1$<br>$E(K_N, P_N) = Z_N$ | . . . repeat until N = some maximum number<br><br><br><br><br><br>$B(BK, ID_0) = X_0$<br>C = N<br>$F^N(X_0) = X_N$<br>$G(X_N) = K_N$<br>Decrypt $(K_N, Z_N) = P_N$<br>$H(X_N, ID_1) = Y_N$<br>$A(Y_N, P_N)$ = Pass or Fail |

In some examples, the user input U may include actual raw data from an entry mechanism (e.g., touch screen, microphone, keyboard, etc.). For example, a gesture may include a symbol swiped on a touch screen grid. In another example, an utterance such as a word, phrase, or other human generated sound may be captured by a microphone. In yet another example, a keyboard or touch screen may capture a user entry on keys, which may be used to derive a passcode (e.g., a string not corresponding to the preconfigured output of the entered keys).

The server 106 manages a base key BK used to derive the initial value $X_0$ and the subsequent unique values $X_N$ per transaction. The BK is used with $ID_0$ to derive $X_0$, then the counter C is used to derive the transaction unique value $X_N$, which is subsequently used to derive the passcode encryption key $K_N$ and the random passcode $P_N$ to authenticate A the client or user device 102.

The translation T uses the user input U and the random variable $Y_N$, which may change per logon attempt, to create the random passcode $P_N$ which is encrypted using $K_N$ to transmit the ciphertext $Z_N$ from the user device 102 to the server 106 for authentication.

Figure 2:
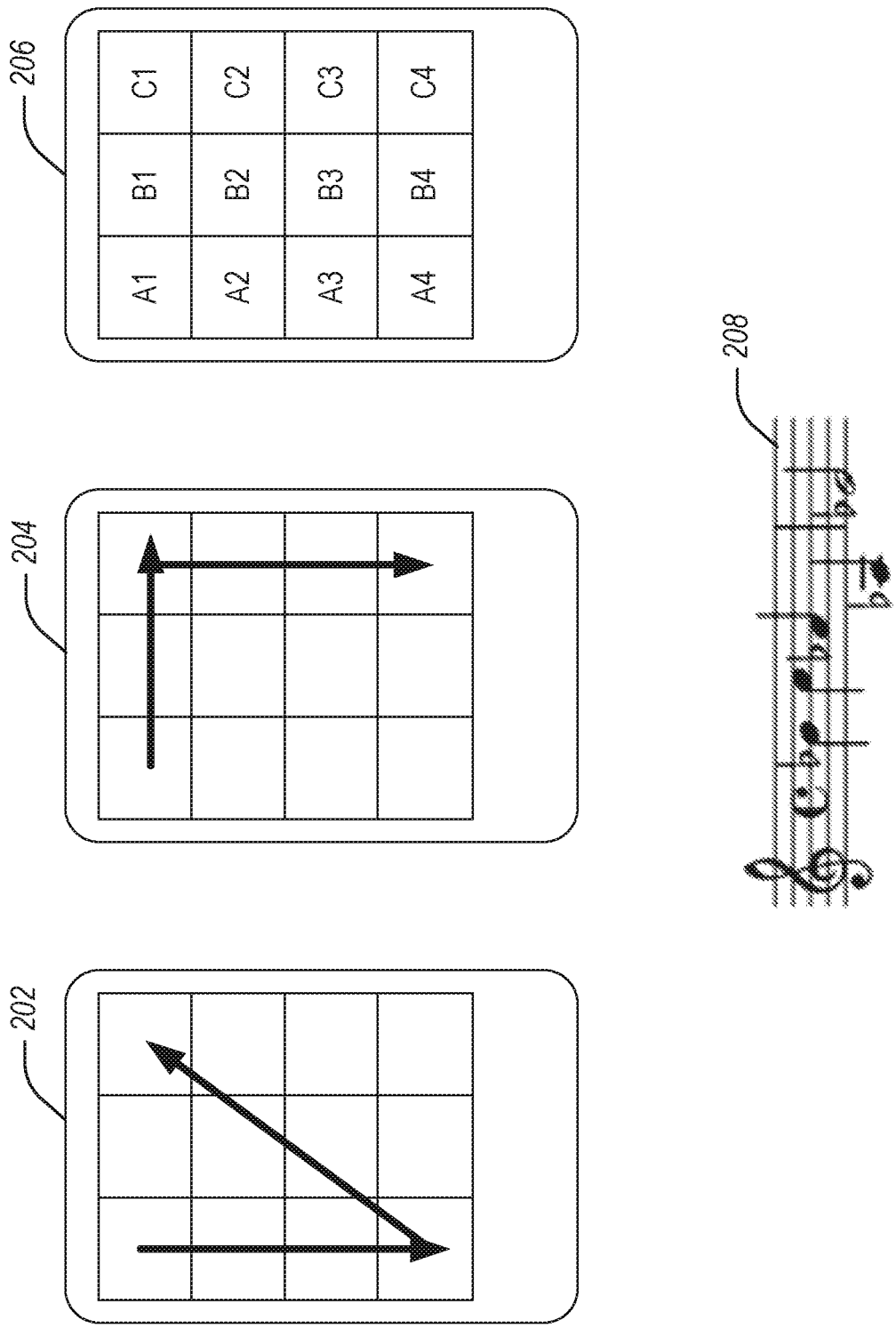
FIG. 2 illustrates example gesture input maps in accordance with some embodiments.

FIG. 2 illustrates example gesture input maps in accordance with some embodiments. A first gesture 202 and a second gesture 204 may correspond to a gesture map 206. The musical notes shown on staff 208 may be mapped to values in some examples.

The gestures 202 and 204 may be made on a touch screen or in the air (e.g., as captured by a camera). In some examples, a same gesture is used repeatedly for local authentication. In other examples, a different gesture may be used for each authentication attempt. In an example, a grid may be generated on a client device. In some examples, the grid may be generated uniquely on each client device, while in other examples, the grid may be generated uniquely for a user (e.g., one grid used on each user device of the user).

The gesture may be translated to a string using the gesture map 206. The two gesture examples 202 and 204 may generate the following sequences:

Passcode 1 gesture 202=A1, A2, A3, A4, B3, B2, C1
Passcode 2 gesture 204=A1, B1, C1, C1, C2, C3, C4

When a static grid assignment is used, each cell always has the same translation code. For example, Table 2 illustrates a static grid as an example.

TABLE 2

|   | A  | B  | C  |
|---|----|----|----|
| 1 | 10 | 11 | 12 |
| 2 | 13 | 14 | 15 |
| 3 | 16 | 17 | 18 |
| 4 | 19 | 20 | 21 |

Thus the two passcodes always have the following values:
Passcode 1 gesture 202=10131619171412
Passcode 2 gesture 204=10111212151821

In this example, the same gestures generate the same passcodes for each logon attempt. The cell assignments may be made as diverse as needed to increase the complexity and diversity of the passcodes. Each cell may contain upper or lower alphabetic characters, a number, a special character, or the like.

In another example, the values in the gesture map 206 may further correspond to values that change. For example, a random or arbitrary value may be assigned to each cell. Table 3 illustrates a first random value table and Table 4 illustrates a second random value table. When the gesture is used different passcodes are generated, providing a stronger one-time-passcode (OTP) authentication method.

TABLE 3

|   | A  | B  | C  |
|---|----|----|----|
| 1 | 30 | 33 | 32 |
| 2 | 34 | 37 | 35 |
| 3 | 31 | 36 | 39 |
| 4 | 40 | 38 | 41 |

TABLE 4

|   | A  | B  | C  |
|---|----|----|----|
| 1 | 52 | 50 | 61 |
| 2 | 51 | 53 | 57 |
| 3 | 55 | 58 | 56 |
| 4 | 54 | 60 | 59 |

Thus the first passcode has a first set of values:
Passcode gesture 202, based on Table 3 in a first logon=30343140363732
Passcode gesture 202, based on Table 4 in a second logon=52515554585361
And the second passcode has a second set of values:
Passcode gesture 204, based on Table 3 in a first logon=30333232353941
Passcode gesture 204, based on Table 4 in a second logon=50506161575659.

The randomness of the grid may be managed using a Y-variable, which may be derived from an X-variable and a device identifier (e.g., as described in Table 1). A server (e.g., server 106) may use a base key (BK) and a user identifier ($ID_0$) to compute an initial value ($X_0$) and synchronizes to a current value ($X_N$) using a counter (C) to determine an encryption key ($K_N$). The server may use the current value ($X_N$) with a device identifier ($ID_1$) to synchronize to a current grid ($Y_N$). The server uses the current grid ($Y_N$) and the registered gesture to determine a derived passcode ($S_N$). The server decrypts the encrypted passcode ($Z_N$) to recover the current passcode ($P_N$), and compares the derived passcode ($S_N$) with the decrypted passcode ($P_N$) for passcode authentication.

In another example, rather than or in addition to a gesture, an utterance-based authentication (UBA) may be used. The user may register a sound pattern, words, or phrase (e.g., according to staff 208), with a client device using a microphone. For example, the user may whistle five notes from a famous movie where the sequence of sounds is the input "U" that initiates a random passcode.

In another example, the user may use a static sequence of unassociated words as the input "U" to initiate a random passcode. The input of words may be spoke or typed. A phrase example may include, "the quick brown fox jumped over the lazy dog's back." A string may be generated using speech recognition to parse the sounds, create a text string, and use the text string as a passphrase which is translated to a random passcode. In another example, biometric verification may be used to parse the phrase, verify the biometric voice sample, and initiate a random passcode.

The translation process may map sounds, syllables, or words to an existing grid, such as shown below in Table 5. The random grid in Table 5 may again correspond to values (e.g., string values), such as discussed above with respect to Tables 2-4.

TABLE 5

|   | A      | B       | C         | D     | E     |
|---|--------|---------|-----------|-------|-------|
| 1 | The    | Kitchen | Over      | Milk  | Who   |
| 2 | Quick  | Music   | Lazy      | Honey | When  |
| 3 | Coffee | Fun     | Dog       | Brown | Where |
| 4 | Tea    | Space   | Back      | Fox   | Why   |
| 5 | Jumped | World   | Satellite | Book  | How   |

In an example, a string for passcode generation may be based on a keyboard input. Rather than using the string corresponding to the inputs, the keyboard input may correspond to a number string based on the grid, for example. A device, such as a user device with a physical or virtual keyboard may be used to enter a password. Typical password rules include allowing or requiring sets of upper, lower, numeric, or special characters. However, this approach, while attempting to increase password strength (because users tend to choose simplistic passwords) reduces the password entropy. Selectable password characters may correspond to entropy in a given language (e.g., English). For each password characters, there are 90 possible values: uppercase alphabetical characters in English have an entropy of 26, as do lowercase alphabetical characters, numeric characters have an entropy of 10, and special characters (e.g., %, $, #, etc.) have an entropy of 28, in an example. The total entropy for all four sets of these characters considered together is 90. For an example 8-character password, there are $90^8$ permutations or specifically 4,304,672,100,000,000 possible passwords, which is about $4\times10^{15}$ entropy. However, when password rules are applied, the entropy is reduced. Assuming the following rules apply: at least one uppercase letter, at least one lowercase letter, at least one numeric character, at least one special character, then the calculation is $26\times26\times10\times28\times90\times90\times90\times90$=12,418,660,800,000 or $12\times10^{12}$ which is three orders of magnitude smaller. This password weakness may be overcome by using the grid technique described above. For example, the possible 90 values may be put into a grid with a random number assigned such that entry of the password is translated to a random passcode.

In an example, a biometric based authentication may be used. Biometrics is a "something you are" authentication factor. In an example, one or more live biometric samples (e.g., fingerprint, voice, iris, face, etc.) may be processed to generate a biometric template. The template may be used subsequently to verify single live samples. The live sample is captured using a biometric reader, and the sample and the template are compared using a matching algorithm. A score may be generated from the matching algorithm. When a score is above some threshold, the matching algorithm may output an indication that the sample is a match, and when the score is below the threshold the output may include an indication that the sample is a non-match. While no two samples are exactly the same, and a sample may never match 100%, the threshold may be set sufficiently high to exclude false positives.

Biometrics suffer inherently from two types of errors, including a false match rate and a false non-match rate. A false match rate occurs, in a one-to-one system, based on a probability that a biometric system falsely verifies an imposter as a legitimate enrollee. In a one-to-many system, a false match rate occurs at a probability that a biometric system incorrectly identifies an individual. This type of error may include a Type II error from hypothesis testing.

A false non-match rate may correspond, in a one-to-one system, to the probability that a biometric system fails to verify the identity of a legitimate enrollee. In a one-to-many system, the false non-match rate corresponds to a probability that a biometric system fails to identify a legitimate enrollee. This may include a Type I error from hypothesis testing.

Despite the fuzziness of the biometric sample, the biometric template may be static, although some technologies support adaptive biometrics. With adaptive biometrics, there may be two thresholds, a lower one is the match threshold and a higher one is the adaptive threshold. When a score is above the adaptive threshold, a match is confirmed. When a score is below the adaptive threshold but above the match threshold, a match is also confirmed but the template is updated. Adaptive biometrics address the natural change with human characteristics. The stable biometric template may be used for translating to a random grid for a random passcode. The output of a biometric sample may include a string, which may be used as the U value described above in Table 1.

Figure 3:
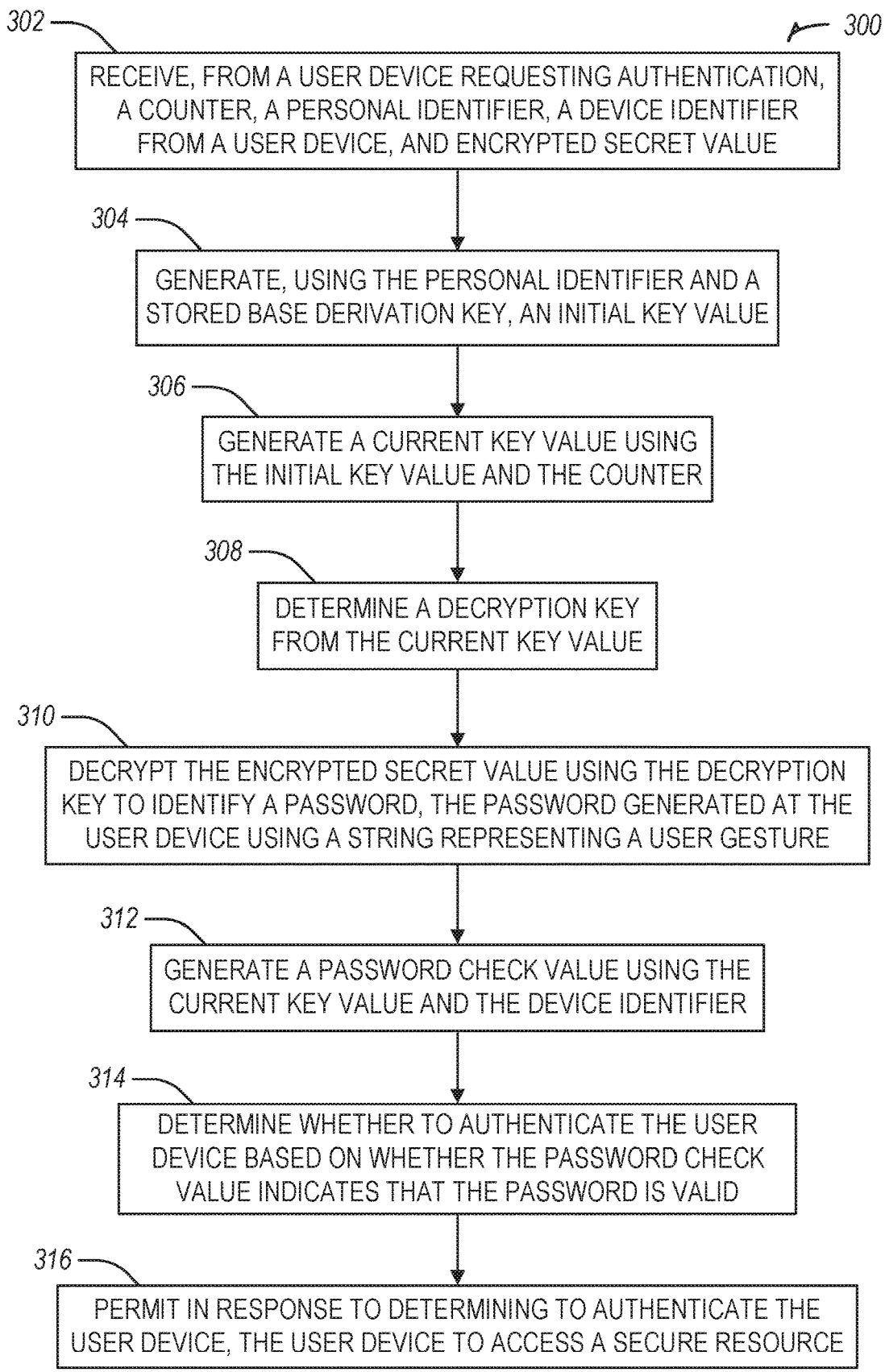
FIG. 3 illustrates a flowchart showing a technique for authenticating user credentials in accordance with some embodiments.

FIG. 3 illustrates a flowchart showing a technique 300 for authenticating user credentials in accordance with some embodiments. In an example, operations of the technique 300 may be performed by processing circuitry, for example by executing instructions stored in memory. The processing circuitry may include a processor, a system on a chip, or other circuitry (e.g., wiring). For example, technique 300 may be performed by processing circuitry of a device (or one or more hardware or software components thereof), such as those illustrated and described with reference to FIG. 1.

The technique 300 includes an operation 302 to receive, from a user device requesting authentication, a counter, a personal identifier, a device identifier from a user device, and encrypted secret value. The counter may be incremented at the user device. The device identifier may be unique to the user device (e.g., a user may have multiple device identifiers, for example one per user device). The technique 300 includes an operation 304 to generate, using the personal identifier and a stored base derivation key an initial key value. The stored base derivation key may be stored on a server. The stored base derivation key may be used to generate keys for multiple users, for example with corresponding personal identifiers. The technique 300 includes an operation 306 to generate a current key value using the initial key value and the counter. The current key value may be derived via an iterative algorithm that starts with the initial key value and iterates a number of times corresponding to the counter. The technique 300 includes an operation 308 to determine a decryption key from the current key value. The current key value may be used to generate the decryption key. The technique 300 includes an operation 310 to decrypt the encrypted secret value using the decryption key to identify a password, the password generated at the user device using a string representing a user gesture. The password may be generated as described above from the user gesture. The technique 300 includes an operation 312 to generate a password check value using the current key value and the device identifier.

The technique 300 includes an operation 314 to determine whether to authenticate the user device based on whether the password check value indicates that the password is valid. Operation 314 may include determining whether the counter has reached a maximum, and not authenticating the user when the counter has reached the maximum. Operation 314 may include not authenticating the user when the counter is below or equal to a stored counter.

The technique 300 includes an operation 316 to permit in response to determining to authenticate the user device, the user device to access a secure resource. The secure resource may include access to a website, a document, a secure environment, an image, a video, a private network, etc.

The technique 300 may include receiving a second authentication request from the user device including an incremented counter, the personal identifier, the device identifier and a new encrypted secret value. In this example, the new encrypted secret value may differ from the encrypted secret value based on a difference between the counter and the incremented counter and based on a difference between the string representing the user gesture and a second string representing a second user gesture.

The technique 300 may include obtaining, from a hashed version of the device identifier, the string from the password. In some examples, the user gesture represented by the string includes a user movement captured by a camera of the user device, an utterance captured by a microphone of the user device, a gesture on a grid of a user interface, or the like. When the gesture is on a grid, the grid may include a static grid that corresponds to changing string values or an arbitrary grid, such as one that changes with each gesture.

The technique 300 may include a subsequent authentication attempt by the user device. This example may include generating a subsequent password at the user device using a subsequent string. The subsequent string may be based on a mapping of keyboard inputs by a user to arbitrary string values. In an example, the subsequent authentication attempt may include generating a subsequent password using a biometric input, the biometric input mapped to arbitrary string values.

Figure 4:
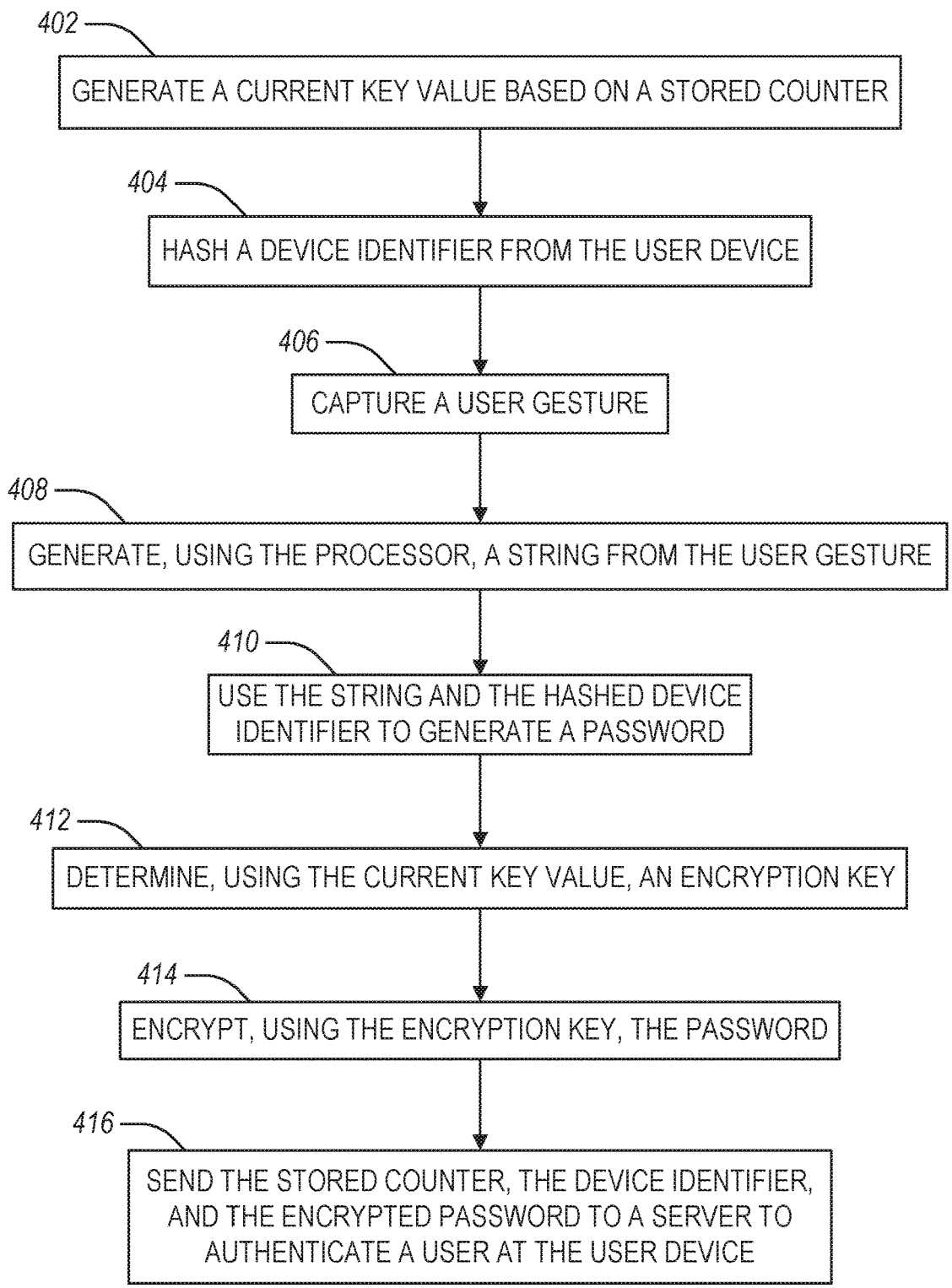
FIG. 4 illustrates a flowchart showing a technique for transmitting authentication credentials from a user device in accordance with some embodiments.

FIG. 4 illustrates a flowchart showing a technique 400 for transmitting authentication credentials from a user device in accordance with some embodiments. In an example, operations of the technique 400 may be performed by processing circuitry, for example by executing instructions stored in memory. The processing circuitry may include a processor, a system on a chip, or other circuitry (e.g., wiring). For example, technique 400 may be performed by processing circuitry of a device (or one or more hardware or software components thereof), such as those illustrated and described with reference to FIG. 1.

The technique 400 includes an operation 402 to generate a current key value based on a stored counter. The current key value may be derived via an iterative algorithm that starts with the initial key value and iterates a number of times corresponding to the counter. The technique 400 includes an operation 404 to hash a device identifier from the user device. The hash may be a one-way hash or a reversible hash, in some examples.

The technique 400 includes an operation 406 to capture a user gesture. Operation 406 may include using a camera to capture a user movement as the gesture. In another example, operation 406 may include using a microphone to capture an utterance. Operation 406 may include using a user interface to capture a gesture on a grid. The grid may include a static grid, such as one that corresponds to changing string values as described herein, or an arbitrary grid (e.g., one that changes with each authentication attempt).

The technique 400 includes an operation 408 to generate, using the processor, a string from the user gesture. The technique 400 includes an operation 410 to use the string and the hashed device identifier to generate a password. The technique 400 includes an operation 412 to determine, using the current key value, an encryption key. The technique 400 includes an operation 414 to encrypt, using the encryption key, the password.

The technique 400 includes an operation 416 to send the stored counter, the device identifier, and the encrypted password to a server to authenticate a user at the user device. Operation 416 may include determining whether the stored counter is lower than a previously sent counter, and only sending the stored counter when the stored counter is not lower than the previously sent counter. In an example, operation 416 includes sending a user identifier to the server, the user identifier used by the server to generate a base key value to generate the current key value based on the stored counter.

The technique 400 may include determining that a maximum counter has been reached, and in response, obtaining a new initial key value. The technique 400 may include incrementing the stored counter. The stored counter may be used in a second authentication attempt, for example to generate a new current key value.

In an example, a second authentication attempt may include using a keyboard input instead of the user gesture to generate the string, the string based on a mapping of the keyboard input to string values other than their entered values. In another example, a second authentication attempt may include using a biometric input instead of the user gesture to generate the string.

Figure 5:
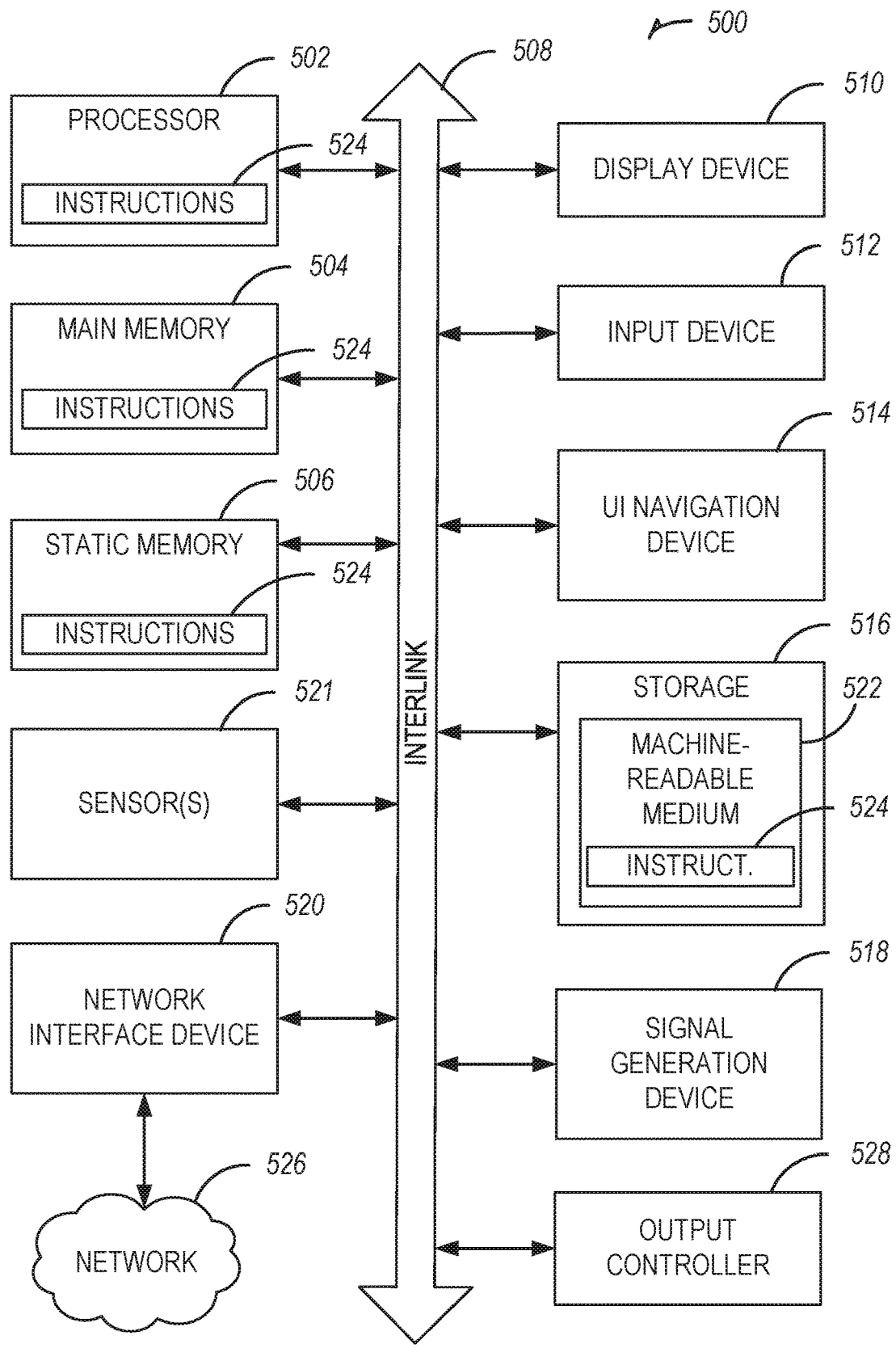
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The following, non-limiting examples, detail certain aspects of the present subject matter to solve the challenges and provide the benefits discussed herein, among others.

Example 1 is a method for authenticating user credentials comprising, receive, from a user device requesting authentication, a counter, a personal identifier, a device identifier from a user device, and encrypted secret value; using the personal identifier and a stored base derivation key, to generate, using a processor, an initial key value; generating, using the processor, a current key value using the initial key value and the counter; determining, using the processor, a decryption key from the current key value; decrypting the encrypted secret value using the decryption key to identify a password, the password generated at the user device using a string representing a user gesture; generating a password check value using the current key value and the device identifier; determining, using the processor, whether to authenticate the user device based on whether the password check value indicates that the password is valid; and in response to determining to authenticate the user device, permitting the user device to access a secure resource.

In Example 2, the subject matter of Example 1 includes, wherein determining whether to authenticate the user includes determining whether the counter has reached a maximum, and not authenticating the user when the counter has reached the maximum.

In Example 3, the subject matter of Examples 1-2 includes, wherein determining whether to authenticate the user includes not authenticating the user when the counter is below or equal to a stored counter.

In Example 4, the subject matter of Examples 1-3 includes, receiving a second authentication request from the user device including an incremented counter, the personal identifier, the device identifier and a new encrypted secret value.

In Example 5, the subject matter of Example 4 includes, wherein the new encrypted secret value differs from the encrypted secret value based on a difference between the counter and the incremented counter and based on a difference between the string representing the user gesture and a second string representing a second user gesture.

In Example 6, the subject matter of Examples 1-5 includes, obtaining, from a hashed version of the device identifier, the string from the password.

In Example 7, the subject matter of Example 6 includes, wherein the user gesture represented by the string includes a user movement captured by a camera of the user device.

In Example 8, the subject matter of Examples 6-7 includes, wherein the user gesture represented by the string includes an utterance captured by a microphone of the user device.

In Example 9, the subject matter of Examples 6-8 includes, wherein the user gesture represented by the string includes a gesture on a grid of a user interface.

In Example 10, the subject matter of Example 9 includes, wherein the grid is a static grid that corresponds to changing string values.

In Example 11, the subject matter of Examples 9-10 includes, wherein the grid is an arbitrary grid, and changes with each gesture.

In Example 12, the subject matter of Examples 1-11 includes, wherein during a subsequent authentication attempt by the user device, a subsequent password is generated at the user device using a subsequent string, wherein the subsequent string is based on a mapping of keyboard inputs by a user to arbitrary string values.

In Example 13, the subject matter of Examples 1-12 includes, wherein during a subsequent authentication attempt by the user device, a subsequent password is generated at the user device using a biometric input, the biometric input mapped to arbitrary string values.

Example 14 is a device for authenticating user credentials comprising, a processor; memory, including instructions, which when executed by the processor, cause the processor to: receive, from a user device requesting authentication, a counter, a personal identifier, a device identifier from a user device, and encrypted secret value; generate, using the personal identifier and a stored base derivation key an initial key value; generate a current key value using the initial key value and the counter; determine a decryption key from the current key value; decrypt the encrypted secret value using the decryption key to identify a password, the password generated at the user device using a string representing a user gesture; generate a password check value using the current key value and the device identifier; determine whether to authenticate the user device based on whether the password check value indicates that the password is valid; and permit in response to determining to authenticate the user device, the user device to access a secure resource.

In Example 15, the subject matter of Example 14 includes, wherein determining whether to authenticate the user includes determining whether the counter has reached a maximum, and not authenticating the user when the counter has reached the maximum.

In Example 16, the subject matter of Examples 14-15 includes, wherein determining whether to authenticate the user includes not authenticating the user when the counter is below or equal to a stored counter.

In Example 17, the subject matter of Examples 14-16 includes, receiving a second authentication request from the user device including an incremented counter, the personal identifier, the device identifier and a new encrypted secret value.

In Example 18, the subject matter of Example 17 includes, wherein the new encrypted secret value differs from the encrypted secret value based on a difference between the counter and the incremented counter and based on a difference between the string representing the user gesture and a second string representing a second user gesture.

In Example 19, the subject matter of Examples 14-18 includes, obtaining, from a hashed version of the device identifier, the string from the password.

In Example 20, the subject matter of Example 19 includes, wherein the user gesture represented by the string includes at least one of a user movement captured by a camera of the user device, an utterance captured by a microphone of the user device, or a gesture on a grid of a user interface.

Example 21 is a method performed at a user device for transmitting authentication credentials, the method comprising: generating, using a processor of the user device, a current key value based on a stored counter; hashing a device identifier from the user device; capturing a user gesture; generating, using the processor, a string from the user gesture; using the string and the hashed device identifier to generate a password; determining, using the current key value, an encryption key; encrypting, using the encryption key, the password; and sending, from the processor, the stored counter, the device identifier, and the encrypted password to a server to authenticate a user at the user device.

In Example 22, the subject matter of Example 21 includes, determining that a maximum counter has been reached, and in response, obtaining a new initial key value.

In Example 23, the subject matter of Examples 21-22 includes, wherein sending the stored counter includes determining whether the stored counter is lower than a previously sent counter, and only sending the stored counter when the stored counter is not lower than the previously sent counter.

In Example 24, the subject matter of Examples 21-23 includes, wherein sending includes sending a user identifier to the server, the user identifier used by the server to generate a base key value to generate the current key value based on the stored counter.

In Example 25, the subject matter of Examples 21-24 includes, incrementing the stored counter.

In Example 26, the subject matter of Example 25 includes, wherein a second authentication attempt uses the incremented stored counter to generate a new current key value.

In Example 27, the subject matter of Examples 21-26 includes, wherein capturing the user gesture includes using a camera to capture a user movement as the user gesture.

In Example 28, the subject matter of Examples 21-27 includes, wherein capturing the user gesture includes using a microphone to capture an utterance.

In Example 29, the subject matter of Examples 21-28 includes, wherein capturing the user gesture includes using a user interface to capture a gesture on a grid.

In Example 30, the subject matter of Example 29 includes, wherein the grid is a static grid that corresponds to changing string values.

In Example 31, the subject matter of Examples 29-30 includes, wherein the grid is an arbitrary grid.

In Example 32, the subject matter of Examples 21-31 includes, wherein in a second authentication attempt, instead of the user gesture, a keyboard input is used to generate the string, the string based on a mapping of the keyboard input to string values other than their entered values.

In Example 33, the subject matter of Examples 21-32 includes, wherein in a second authentication attempt, instead of the user gesture, a biometric input is used to generate the string.

Example 34 is a user device for transmitting authentication credentials, the user device comprising: a processor; memory, including instructions, which when executed by the processor, cause the processor to: generate a current key value based on a stored counter; hash a device identifier from the user device; capture a user gesture; generate, using the processor, a string from the user gesture; use the string and the hashed device identifier to generate a password; determine, using the current key value, an encryption key; encrypt, using the encryption key, the password; and send the stored counter, the device identifier, and the encrypted password to a server to authenticate a user at the user device.

In Example 35, the subject matter of Example 34 includes, wherein the instructions further cause the processor to determine that a maximum counter has been reached, and in response, obtaining a new initial key value.

In Example 36, the subject matter of Examples 34-35 includes, wherein to send the stored counter includes to determine whether the stored counter is lower than a previously sent counter, and only send the stored counter when the stored counter is not lower than the previously sent counter.

In Example 37, the subject matter of Examples 34-36 includes, wherein to send includes to send a user identifier to the server, the user identifier used by the server to generate a base key value to generate the current key value based on the stored counter.

In Example 38, the subject matter of Examples 34-37 includes, wherein the instructions further cause the processor to increment the stored counter.

In Example 39, the subject matter of Example 38 includes, wherein a second authentication attempt uses the incremented stored counter to generate a new current key value.

In Example 40, the subject matter of Examples 34-39 includes, wherein to capture the user gesture includes to use a camera to capture a user movement as the user gesture.

In Example 41, the subject matter of Examples 34-40 includes, wherein to capture the user gesture includes to use a microphone to capture an utterance.

In Example 42, the subject matter of Examples 34-41 includes, wherein to capture the user gesture includes to use a user interface to capture a gesture on a grid.

In Example 43, the subject matter of Example 42 includes, wherein the grid is a static grid that corresponds to changing string values.

In Example 44, the subject matter of Examples 42-43 includes, wherein the grid is an arbitrary grid.

In Example 45, the subject matter of Examples 34-44 includes, wherein in a second authentication attempt, instead of the user gesture, a keyboard input is used to generate the string, the string based on a mapping of the keyboard input to string values other than their entered values.

In Example 46, the subject matter of Examples 34-45 includes, wherein in a second authentication attempt, instead of the user gesture, a biometric input is used to generate the string.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for authenticating user credentials comprising,
   receiving, at a server, from a user device requesting authentication, a counter, a personal identifier, a device identifier from the user device, and an encrypted secret value, the encrypted secret value created using a cryptographic key;
   using the personal identifier and a stored base derivation key, to generate, using a processor, an initial key value;
   generating, using the processor, a current key value using the initial key value and the counter;
   applying a function to the current key value to output the cryptographic key;
   decrypting the encrypted secret value using the cryptographic key to identify a password, wherein the password is generated at the user device using a string sequence representing a user gesture and a dynamic value table corresponding to the string sequence, the string sequence generated using a gesture map;
   generating, at the server, a password check value using the current key value and the device identifier to construct the dynamic value table corresponding to the gesture map;
   determining, using the processor, whether to authenticate the user device based on whether the password check value indicates that the password is valid; and
   in response to determining to authenticate the user device, permitting the user device to access a secure resource.

2. The method of claim 1, wherein determining whether to authenticate the user includes determining whether the counter has reached a maximum, and not authenticating the user when the counter has reached the maximum.

3. The method of claim 1, wherein determining whether to authenticate the user includes not authenticating the user when the counter is below or equal to a stored counter.

4. The method of claim 1, further comprising receiving a second authentication request from the user device including an incremented counter, the personal identifier, the device identifier and a new encrypted secret value.

5. The method of claim 4, wherein the new encrypted secret value differs from the encrypted secret value based on a difference between the counter and the incremented counter and based on a difference between the string representing the user gesture and a second string representing a second user gesture.

6. The method of claim 1, further comprising, obtaining, from a hashed version of the device identifier, the string from the password.

7. The method of claim 6, wherein the user gesture represented by the string includes a user movement captured by a camera of the user device.

8. The method of claim 6, wherein the user gesture represented by the string includes an utterance captured by a microphone of the user device.

9. The method of claim 6, wherein the user gesture represented by the string includes a gesture on a grid of a user interface.

10. The method of claim 9, wherein the grid is a static grid that corresponds to changing string values.

11. The method of claim 9, wherein the grid is an arbitrary grid, and changes with each gesture.

12. The method of claim 1, wherein during a subsequent authentication attempt by the user device, a subsequent password is generated at the user device using a subsequent string, wherein the subsequent string is based on a mapping of keyboard inputs by a user to arbitrary string values.

13. The method of claim 1, wherein during a subsequent authentication attempt by the user device, a subsequent password is generated at the user device using a biometric input, the biometric input mapped to arbitrary string values.

14. A device for authenticating user credentials comprising,
   a processor;
   memory, including instructions, which when executed by the processor, cause the processor to:
   receive, at a server, from a user device requesting authentication, a counter, a personal identifier, a device identifier from the user device, and an encrypted secret value, the encrypted secret value created using a cryptographic key;
   generate, using the personal identifier and a stored base derivation key an initial key value;

generate a current key value using the initial key value and the counter;

apply a function to the current key value to output the cryptographic key;

decrypt the encrypted secret value using the cryptographic key to identify a password, wherein the password is generated at the user device using a string sequence representing a user gesture and a dynamic value table corresponding to the string sequence, the string sequence generated using a gesture map;

generate, at the server, a password check value using the current key value and the device identifier to construct the dynamic value table corresponding to the gesture map;

determine whether to authenticate the user device based on whether the password check value indicates that the password is valid; and permit in response to determining to authenticate the user device, the user device to access a secure resource.

15. The device of claim 14, wherein determining whether to authenticate the user includes determining whether the counter has reached a maximum, and not authenticating the user when the counter has reached the maximum.

16. The device of claim 14, wherein determining whether to authenticate the user includes not authenticating the user when the counter is below or equal to a stored counter.

17. The device of claim 14, further comprising receiving a second authentication request from the user device including an incremented counter, the personal identifier, the device identifier and a new encrypted secret value.

18. The device of claim 17, wherein the new encrypted secret value differs from the encrypted secret value based on a difference between the counter and the incremented counter and based on a difference between the string representing the user gesture and a second string representing a second user gesture.

19. The device of claim 14, further comprising, obtaining, from a hashed version of the device identifier, the string from the password.

20. The device of claim 19, wherein the user gesture represented by the string includes at least one of a user movement captured by a camera of the user device, an utterance captured by a microphone of the user device, or a gesture on a grid of a user interface.

* * * * *